(12) United States Patent
Chandrasekar et al.

(10) Patent No.: US 7,958,112 B2
(45) Date of Patent: Jun. 7, 2011

(54) INTERLEAVING QUERY TRANSFORMATIONS FOR XML INDEXES

(75) Inventors: Sivasankaran Chandrasekar, Menlo Park, CA (US); Asha Tarachandani, Newark, CA (US); Thomas Baby, Maple Valley, WA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 388 days.

(21) Appl. No.: 12/189,007

(22) Filed: Aug. 8, 2008

(65) Prior Publication Data

US 2010/0036825 A1  Feb. 11, 2010

(51) Int. Cl.
*G06F 17/30* (2006.01)

(52) U.S. Cl. .................................... 707/713; 707/769

(58) Field of Classification Search .......... 707/713–720, 707/760, 769, 797
See application file for complete search history.

(56) References Cited

U.S. PATENT DOCUMENTS

| | | | |
|---|---|---|---|
| 4,993,025 A | 2/1991 | Vesel et al. |
| 5,202,982 A | 4/1993 | Gramlich et al. |
| 5,210,686 A | 5/1993 | Jernigan |
| 5,226,137 A | 7/1993 | Bolan et al. |
| 5,247,658 A | 9/1993 | Barrett et al. |
| 5,257,366 A * | 10/1993 | Adair et al. |
| 5,295,256 A | 3/1994 | Bapat |
| 5,295,261 A | 3/1994 | Simonetti |
| 5,307,490 A | 4/1994 | Davidson et al. |
| 5,313,629 A * | 5/1994 | Abraham et al. |
| 5,327,556 A | 7/1994 | Mohan et al. |
| 5,369,763 A | 11/1994 | Biles |
| 5,388,257 A | 2/1995 | Bauer |
| 5,404,513 A | 4/1995 | Powers et al. |
| 5,410,691 A | 4/1995 | Taylor |
| 5,454,101 A | 9/1995 | Mackay et al. |
| 5,463,772 A | 10/1995 | Thompson et al. |
| 5,467,471 A | 11/1995 | Bader |
| 5,499,371 A | 3/1996 | Henninger et al. |
| 5,504,892 A | 4/1996 | Atsatt et al. |
| 5,506,991 A | 4/1996 | Curry et al. |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,548,755 A | 8/1996 | Leung et al. |
| 5,561,763 A | 10/1996 | Eto et al. |
| 5,566,331 A | 10/1996 | Irwin, Jr. et al. |
| 5,568,640 A | 10/1996 | Nishiyama et al. |
| 5,574,915 A | 11/1996 | Lemon et al. |

(Continued)

FOREIGN PATENT DOCUMENTS

EP          856803 A2 *   8/1998

(Continued)

OTHER PUBLICATIONS

Ahmed, Rafi et al., Cost-Based Query Transformation in Oracle. Oracle USA, ACM Sep. 6, 2006.

(Continued)

*Primary Examiner* — Cam-Linh Nguyen
(74) *Attorney, Agent, or Firm* — Hickman Palermo Truong & Becker LLP

(57) ABSTRACT

During query optimization, XML index and view merge transformations may be interleaved.

12 Claims, 1 Drawing Sheet

U.S. PATENT DOCUMENTS

| | | | |
|---|---|---|---|
| 5,588,150 A | 12/1996 | Lin et al. |
| 5,625,815 A | 4/1997 | Maier et al. |
| 5,630,125 A | 5/1997 | Zellweger |
| 5,643,633 A | 7/1997 | Telford et al. |
| 5,680,614 A | 10/1997 | Bakuya et al. |
| 5,682,524 A | 10/1997 | Freund et al. |
| 5,684,990 A | 11/1997 | Boothby |
| 5,689,706 A | 11/1997 | Rao et al. |
| 5,701,467 A | 12/1997 | Freeston |
| 5,717,911 A | 2/1998 | Madrid et al. |
| 5,724,570 A | 3/1998 | Zeller et al. |
| 5,724,577 A | 3/1998 | Exley et al. |
| 5,734,887 A | 3/1998 | Kingberg et al. |
| 5,737,736 A | 4/1998 | Chang |
| 5,758,153 A | 5/1998 | Atsatt et al. |
| 5,797,136 A | 8/1998 | Boyer et al. |
| 5,802,518 A | 9/1998 | Karaev et al. |
| 5,819,275 A | 10/1998 | Badger et al. |
| 5,822,511 A | 10/1998 | Kashyap et al. |
| 5,832,526 A | 11/1998 | Schuyler |
| 5,838,965 A | 11/1998 | Kavanagh et al. |
| 5,842,212 A | 11/1998 | Balluvio et al. |
| 5,848,246 A | 12/1998 | Gish |
| 5,870,590 A | 2/1999 | Kita et al. |
| 5,878,415 A | 3/1999 | Olds |
| 5,878,434 A | 3/1999 | Draper et al. |
| 5,892,535 A * | 4/1999 | Allen et al. |
| 5,897,632 A | 4/1999 | Dar et al. |
| 5,905,990 A | 5/1999 | Inglett |
| 5,915,253 A | 6/1999 | Christiansen |
| 5,917,492 A | 6/1999 | Bereiter et al. |
| 5,918,225 A | 6/1999 | White et al. |
| 5,921,582 A | 7/1999 | Gusack |
| 5,937,406 A | 8/1999 | Balabine et al. |
| 5,940,591 A | 8/1999 | Boyle et al. |
| 5,950,188 A | 9/1999 | Wildermuth |
| 5,960,194 A | 9/1999 | Choy et al. |
| 5,963,932 A | 10/1999 | Jakobsson et al. |
| 5,964,407 A | 10/1999 | Sandkleiva |
| 5,974,407 A | 10/1999 | Sacks |
| 5,978,791 A | 11/1999 | Farber et al. |
| 5,983,215 A | 11/1999 | Ross et al. |
| 5,987,506 A | 11/1999 | Carter et al. |
| 5,991,771 A | 11/1999 | Falls et al. |
| 5,999,936 A | 12/1999 | Pattison et al. |
| 5,999,941 A * | 12/1999 | Andersen |
| 6,003,040 A | 12/1999 | Mital et al. |
| 6,012,067 A | 1/2000 | Sarkar |
| 6,023,706 A | 2/2000 | Schmuck et al. |
| 6,023,765 A | 2/2000 | Kuhn |
| 6,029,160 A | 2/2000 | Cabrera et al. |
| 6,029,166 A | 2/2000 | Mutalik et al. |
| 6,029,175 A | 2/2000 | Chow et al. |
| 6,032,143 A | 2/2000 | Leung et al. |
| 6,038,563 A | 3/2000 | Bapat et al. |
| 6,052,122 A | 4/2000 | Sutcliffe et al. |
| 6,055,544 A | 4/2000 | DeRose et al. |
| 6,061,676 A | 5/2000 | Srivastava et al. |
| 6,061,684 A | 5/2000 | Glasser et al. |
| 6,088,694 A | 7/2000 | Burns et al. |
| 6,092,086 A | 7/2000 | Martin et al. |
| 6,101,500 A | 8/2000 | Lau |
| 6,111,578 A | 8/2000 | Tesler |
| 6,112,209 A | 8/2000 | Gusack |
| 6,115,741 A | 9/2000 | Domenikos et al. |
| 6,119,118 A | 9/2000 | Kain, III et al. |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,185,574 B1 | 2/2001 | Howard et al. |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmon |
| 6,212,512 B1 | 4/2001 | Barney et al. |
| 6,212,557 B1 | 4/2001 | Oran |
| 6,230,310 B1 | 5/2001 | Arrouye et al. |
| 6,233,729 B1 | 5/2001 | Campara et al. |
| 6,236,988 B1 * | 5/2001 | Aldred |
| 6,240,407 B1 | 5/2001 | Chang et al. |
| 6,247,024 B1 | 6/2001 | Kincaid |
| 6,263,332 B1 | 7/2001 | Nasr et al. |
| 6,269,380 B1 | 7/2001 | Terry et al. |
| 6,269,431 B1 | 7/2001 | Dunham |
| 6,279,006 B1 | 8/2001 | Shigemi et al. |
| 6,279,007 B1 | 8/2001 | Uppala |
| 6,285,997 B1 | 9/2001 | Carey et al. |
| 6,298,349 B1 | 10/2001 | Toyoshima et al. |
| 6,301,605 B1 | 10/2001 | Napolitano et al. |
| 6,321,219 B1 | 11/2001 | Gainer et al. |
| 6,330,573 B1 | 12/2001 | Salisbury et al. |
| 6,339,382 B1 | 1/2002 | Arbinger et al. |
| 6,339,768 B1 | 1/2002 | Leung et al. |
| 6,341,289 B1 | 1/2002 | Burroughs et al. |
| 6,343,287 B1 | 1/2002 | Kumar et al. |
| 6,349,295 B1 | 2/2002 | Tedesco et al. |
| 6,356,887 B1 | 3/2002 | Berenson et al. |
| 6,356,889 B1 | 3/2002 | Lohman et al. |
| 6,356,920 B1 | 3/2002 | Vandersluis |
| 6,363,371 B1 | 3/2002 | Chaudhuri et al. |
| 6,366,921 B1 | 4/2002 | Hansen et al. |
| 6,366,934 B1 | 4/2002 | Cheng et al. |
| 6,370,524 B1 | 4/2002 | Witkowski |
| 6,370,537 B1 | 4/2002 | Gilbert et al. |
| 6,370,548 B1 | 4/2002 | Bauer et al. |
| 6,389,427 B1 | 5/2002 | Faulkner |
| 6,389,433 B1 | 5/2002 | Bolosky et al. |
| 6,393,435 B1 | 5/2002 | Gartner et al. |
| 6,397,231 B1 | 5/2002 | Salisbury et al. |
| 6,418,448 B1 | 7/2002 | Sarkar |
| 6,421,658 B1 | 7/2002 | Carey et al. |
| 6,421,692 B1 | 7/2002 | Milne et al. |
| 6,427,123 B1 | 7/2002 | Sedlar |
| 6,438,540 B2 | 8/2002 | Nasr et al. |
| 6,438,550 B1 | 8/2002 | Doyle et al. |
| 6,438,562 B1 | 8/2002 | Gupta et al. |
| 6,442,548 B1 | 8/2002 | Balabine et al. |
| 6,446,091 B1 | 9/2002 | Noren et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,526,403 B1 | 2/2003 | Lin et al. |
| 6,529,896 B1 | 3/2003 | Leung et al. |
| 6,529,901 B1 | 3/2003 | Chaudhuri et al. |
| 6,536,889 B1 | 3/2003 | Biegelsen et al. |
| 6,539,398 B1 | 3/2003 | Hannan et al. |
| 6,542,898 B1 | 4/2003 | Sullivan et al. |
| 6,571,231 B2 | 5/2003 | Sedlar |
| 6,574,655 B1 | 6/2003 | Libert et al. |
| 6,584,459 B1 | 6/2003 | Chang et al. |
| 6,594,675 B1 | 7/2003 | Schneider |
| 6,604,100 B1 | 8/2003 | Fernandez et al. |
| 6,609,121 B1 * | 8/2003 | Ambrosini et al. |
| 6,611,843 B1 | 8/2003 | Jacobs |
| 6,615,203 B1 | 9/2003 | Lin et al. |
| 6,636,845 B2 | 10/2003 | Chau et al. |
| 6,643,633 B2 | 11/2003 | Chau et al. |
| 6,675,230 B1 | 1/2004 | Lewallen |
| 6,681,221 B1 | 1/2004 | Jacobs |
| 6,684,227 B2 | 1/2004 | Duxbury |
| 6,697,805 B1 | 2/2004 | Choquier et al. |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,721,723 B1 | 4/2004 | Gibson et al. |
| 6,725,212 B2 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,778,977 B1 | 8/2004 | Avadhanam et al. |
| 6,785,673 B1 | 8/2004 | Fernandez et al. |
| 6,795,821 B2 | 9/2004 | Yu |

| Patent Number | Date | Inventor(s) |
|---|---|---|
| 6,826,568 B2 | 11/2004 | Bernstein et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,871,204 B2 | 3/2005 | Krishnaprasad et al. |
| 6,901,403 B1 | 5/2005 | Bata et al. |
| 6,915,304 B2 | 7/2005 | Krupa |
| 6,920,457 B2 | 7/2005 | Pressmar |
| 6,947,927 B2 | 9/2005 | Chaudhuri et al. |
| 6,964,025 B2 * | 11/2005 | Angiulo et al. |
| 7,013,311 B2 | 3/2006 | Hui et al. |
| 7,031,956 B1 | 4/2006 | Lee et al. |
| 7,043,488 B1 | 5/2006 | Baer et al. |
| 7,099,858 B2 * | 8/2006 | Aldrich et al. |
| 7,120,645 B2 | 10/2006 | Manikutty et al. |
| 7,139,746 B2 | 11/2006 | Shin et al. |
| 7,139,749 B2 | 11/2006 | Bossman et al. |
| 7,162,485 B2 | 1/2007 | Gottlob et al. |
| 7,167,848 B2 | 1/2007 | Boukouvalas et al. |
| 7,167,852 B1 | 1/2007 | Ahmed et al. |
| 7,171,404 B2 | 1/2007 | Lindblad et al. |
| 7,171,407 B2 | 1/2007 | Barton et al. |
| 7,194,462 B2 | 3/2007 | Riccardi et al. |
| 7,216,127 B2 | 5/2007 | Auerbach |
| 7,228,312 B2 | 6/2007 | Chaudhuri et al. |
| 7,315,852 B2 | 1/2008 | Balmin et al. |
| 7,359,922 B2 | 4/2008 | Young-Lai et al. |
| 7,386,568 B2 | 6/2008 | Warner et al. |
| 7,499,915 B2 | 3/2009 | Chandrasekar et al. |
| 7,685,150 B2 | 3/2010 | Manikutty et al. |
| 2001/0037345 A1 | 11/2001 | Kiernan et al. |
| 2001/0047372 A1 | 11/2001 | Gorelik et al. |
| 2001/0049675 A1 | 12/2001 | Mandler et al. |
| 2002/0007375 A1 | 1/2002 | Ebata |
| 2002/0015042 A1 | 2/2002 | Robotham et al. |
| 2002/0035606 A1 | 3/2002 | Kenton |
| 2002/0038358 A1 | 3/2002 | Sweatt, III et al. |
| 2002/0056025 A1 | 5/2002 | Qiu et al. |
| 2002/0073019 A1 | 6/2002 | Deaton |
| 2002/0078068 A1 | 6/2002 | Krishnaprasad et al. |
| 2002/0087596 A1 | 7/2002 | Lewontin |
| 2002/0116371 A1 | 8/2002 | Dodds et al. |
| 2002/0116457 A1 | 8/2002 | Eshleman et al. |
| 2002/0120685 A1 | 8/2002 | Srivastava et al. |
| 2002/0123993 A1 | 9/2002 | Chau et al. |
| 2002/0124100 A1 * | 9/2002 | Adams |
| 2002/0133484 A1 | 9/2002 | Chau et al. |
| 2002/0133497 A1 | 9/2002 | Draper et al. |
| 2002/0143512 A1 | 10/2002 | Shamoto et al. |
| 2002/0152267 A1 | 10/2002 | Lennon |
| 2002/0156772 A1 | 10/2002 | Chau et al. |
| 2002/0156811 A1 | 10/2002 | Krupa |
| 2002/0169788 A1 | 11/2002 | Lee et al. |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0065659 A1 * | 4/2003 | Agarwal et al. |
| 2003/0078906 A1 | 4/2003 | Ten-Hove et al. |
| 2003/0084056 A1 | 5/2003 | DeAnna et al. |
| 2003/0093672 A1 | 5/2003 | Cichowlas |
| 2003/0097383 A1 | 5/2003 | Smirnov et al. |
| 2003/0101194 A1 | 5/2003 | Rys et al. |
| 2003/0105732 A1 | 6/2003 | Kagalwala et al. |
| 2003/0115548 A1 | 6/2003 | Melgar |
| 2003/0131051 A1 | 7/2003 | Lection et al. |
| 2003/0140308 A1 | 7/2003 | Murthy et al. |
| 2003/0158897 A1 | 8/2003 | Ben-Natan et al. |
| 2003/0167277 A1 | 9/2003 | Hejlsberg et al. |
| 2003/0172135 A1 | 9/2003 | Bobick et al. |
| 2003/0177341 A1 | 9/2003 | Devillers |
| 2003/0182276 A1 | 9/2003 | Bossman et al. |
| 2003/0182624 A1 | 9/2003 | Large |
| 2003/0212662 A1 | 11/2003 | Shin et al. |
| 2003/0212664 A1 | 11/2003 | Breining et al. |
| 2003/0226111 A1 | 12/2003 | Wirts et al. |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 | 4/2004 | Manikutty et al. |
| 2004/0088320 A1 | 5/2004 | Perry |
| 2004/0088415 A1 | 5/2004 | Chandrasekar et al. |
| 2004/0093344 A1 | 5/2004 | Berger et al. |
| 2004/0103105 A1 | 5/2004 | Lindblad et al. |
| 2004/0103282 A1 | 5/2004 | Meier et al. |
| 2004/0143581 A1 | 7/2004 | Bohannon et al. |
| 2004/0148278 A1 | 7/2004 | Milo et al. |
| 2004/0163041 A1 | 8/2004 | Engel |
| 2004/0167864 A1 | 8/2004 | Wang et al. |
| 2004/0176958 A1 | 9/2004 | Salmenkaita et al. |
| 2004/0177080 A1 | 9/2004 | Doise et al. |
| 2004/0205551 A1 | 10/2004 | Santos |
| 2004/0220911 A1 | 11/2004 | Zuzarte et al. |
| 2004/0220912 A1 | 11/2004 | Manikutty et al. |
| 2004/0220923 A1 | 11/2004 | Nica |
| 2004/0220927 A1 | 11/2004 | Murthy et al. |
| 2004/0220946 A1 | 11/2004 | Krishnaprasad et al. |
| 2004/0225680 A1 | 11/2004 | Cameron et al. |
| 2004/0230667 A1 | 11/2004 | Wookey |
| 2004/0230893 A1 | 11/2004 | Elza et al. |
| 2004/0236762 A1 | 11/2004 | Chaudhuri et al. |
| 2004/0243555 A1 | 12/2004 | Bolsius et al. |
| 2004/0255046 A1 | 12/2004 | Ringseth et al. |
| 2004/0260683 A1 | 12/2004 | Chan et al. |
| 2004/0267760 A1 | 12/2004 | Brundage et al. |
| 2005/0004907 A1 | 1/2005 | Bruno et al. |
| 2005/0010896 A1 | 1/2005 | Meliksetian et al. |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0065949 A1 | 3/2005 | Warner et al. |
| 2005/0091188 A1 | 4/2005 | Pal et al. |
| 2005/0097084 A1 | 5/2005 | Balmin et al. |
| 2005/0120000 A1 | 6/2005 | Ziauddin et al. |
| 2005/0120029 A1 | 6/2005 | Tomic et al. |
| 2005/0120031 A1 | 6/2005 | Ishii |
| 2005/0138047 A1 | 6/2005 | Liu et al. |
| 2005/0198013 A1 | 9/2005 | Cunningham et al. |
| 2005/0203933 A1 | 9/2005 | Chaudhuri et al. |
| 2005/0228786 A1 | 10/2005 | Murthy et al. |
| 2005/0228791 A1 | 10/2005 | Thusoo et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0240624 A1 | 10/2005 | Ge et al. |
| 2005/0257201 A1 | 11/2005 | Rose et al. |
| 2005/0283471 A1 | 12/2005 | Ahmed |
| 2005/0289125 A1 | 12/2005 | Liu et al. |
| 2005/0289175 A1 | 12/2005 | Krishnaprasad et al. |
| 2006/0031204 A1 | 2/2006 | Liu et al. |
| 2006/0031233 A1 | 2/2006 | Liu et al. |
| 2006/0041537 A1 * | 2/2006 | Ahmed ............................. 707/3 |
| 2006/0074901 A1 | 4/2006 | Pirahesh et al. |
| 2006/0101011 A1 | 5/2006 | Lindsay et al. |
| 2006/0101073 A1 | 5/2006 | Popa et al. |
| 2006/0129584 A1 | 6/2006 | Hoang et al. |
| 2006/0179068 A1 | 8/2006 | Warner et al. |
| 2006/0212420 A1 * | 9/2006 | Murthy ............................. 707/1 |
| 2006/0212491 A1 * | 9/2006 | Agrawal et al. |
| 2006/0224564 A1 | 10/2006 | Yu et al. |
| 2006/0224627 A1 | 10/2006 | Manikutty et al. |
| 2006/0235840 A1 | 10/2006 | Manikutty et al. |
| 2007/0011167 A1 | 1/2007 | Krishnaprasad et al. |
| 2007/0043696 A1 | 2/2007 | Haas et al. |
| 2007/0083809 A1 | 4/2007 | Tarachandani |
| 2008/0222087 A1 | 9/2008 | Balmin et al. |
| 2010/0030726 A1 | 2/2010 | Chandrasekar et al. |
| 2010/0036825 A1 | 2/2010 | Chandrasekar |

FOREIGN PATENT DOCUMENTS

| | | |
|---|---|---|
| EP | 1 241589 A2 * | 9/2002 |
| WO | WO 97/46956 * | 12/1997 |
| WO | WO 00/14632 * | 3/2000 |

| | | | | |
|---|---|---|---|---|
| WO | WO 00/49533 | A2 | * | 8/2000 |
| WO | WO 01/42881 | A2 | * | 6/2001 |
| WO | WO 01/59602 | A1 | * | 8/2001 |
| WO | WO 01/61566 | A1 | * | 8/2001 |
| WO | WO 03/027908 | A2 | * | 4/2003 |
| WO | WO 03107576 | | * | 12/2003 |
| WO | WO 2006026534 | | * | 3/2006 |

OTHER PUBLICATIONS

Chaudhuri, Surajit, An Overview of Query Optimization in Relational Systems, Microsoft Research. Pub. 1998.

Chaudhuri, Surajit & Kyuseck Shim, Including Group-By in Query Optimization, Hewlitt-Packard Laboratories, 20$^{th}$ VLDB Conference, Chile, 1994.

Chen, Changqing et al., View merging in the context of view selection, Database Engineering and Applications Symposium, 2002. Proceedings. International Jul. 17-19, 2002, pp. 33-42.

DeHaan, David, A Rewriting Algorithm for Multi-Block Aggregation Queries and Views using Prerequisites and Compensations, University of Waterloo, Canada, Technical Report CS-2004-25. May 3, 2004.

Deutsch, Alin et al., Minimization and Group-By Detection for Nested XQueries, University of California, San Diego, Pub. 2003.

Erickson, Gail, Microsoft TechNet.Improving Performance with SQL Server 2000 Indexed Views. Microsoft Corp. Sep. 2000.

Galindo-Legaria, Cesar & A. Rosenthal, Outerjoin Simplification and Reordering for Query Optimization, ACM 1997.

Hayu, John, Analytic SQL Features in Oracle9i, an Oracle Technical White Paper, Dec. 2001.

Mishra, Priti & Margaret H. Eich, Join Processing in Relational Databases, ACM Computing Surveys. Mar. 1992.

Muralikrishna, M., Improved Unnesting Algorithm for Join Aggregate SQL Queries, 18$^{th}$ VLDB Conference, Canada, 1992.

Oracle8i Tuning Release 8.1.5 A67775-01. Optimizer Modes, Plans Stability, and Hints. Oracle Website. Copyright 1999.

Seshadr, Praveen et al., Cost-Based Optimization for Magic: Algebra and Implementation. SIGMOD Jun. '96. ACM 1996.

Banerjee, Sandeepan et al., "Oracle8i—The XML Enabled Data Management System"—Oracle Corporation, Mar. 2000, IEEE, pp. 561-568.

Banerjee, Sandeepan et al., "XML Query (XQuery) Support in Oracle Database 10g Release 2," An Oracle White Paper, May 2005, 43 pages.

Bohannon, Philip et al. "From XML Schema to Relations: A Cost-Based Approach to XML Storage"—Bell Laboratories, IEEE—2002—Proceedings of the 18th International Conference on Data Engineering (ICDE '02), pp. 1-28.

Bourret, R. et al.: A generic Load/Extract Utility for Data Transfer Between XML Documents and Relational Databases, Jun. 8-9, 2000, IEEE computing SOC., pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Buxton, Stephen et al., "Query XML," An Oracle White Paper, Dec. 2004, 29 pages.

Chae, Mi-Ok, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender, An end-to-end solution for storing and retrieving XML documents." IEEE, ICDE '00 Conference, San Diego, Feb. 2000, 128 pages.

Clark, James et al., "XM Path Language (XPath) Version 1.0," W3C Recommendation, Nov. 16, 1999, located on the internet at <http://w3.org/TR/xpath>, retrieved on Nov. 6, 2006, 22 pages.

Dayen, I., "Storing XML in Relational Databases", XML.com, XP-002275971(1998-2004), pp. 1-13.

Funderbunk, J. et al., "XML programming with SQL/XML and XQuery", IBM Systems Journal, XP-002295973 (2002), pp. 642-665.

Gennick, Jonathan, "XQuery Flowers," Oracle network, as Published in Oracle Magazine, Sep./Oct. 2005, 6 pages.

Hierarchical Queries, XP-002295972, pp. 8-3 to 8-7.

Jajodia, Sushil, et al., "Toward a Multilevel Secure Relational Data Model," ACM, 1991, 8393 SIGMOD Record, Jun. 20, 1991, No. 2, New York, US, XP 000364619, pp. 50-59.

Khan, Latifur et al., "Performance Evaluation of Storing XML Data in Relational Database Management Systems", ACM-2001 (pp. 31-38).

Krishnaprasad, Muralidhar et al., "Query Rewrite for XML in Oracle XML DB," Proceeding of the 30$^{th}$ VLDB Conference, 2004, 12 pages.

Kvitka, Carline, "XQuery: A New Way to Search," Oracle Technology Network, As Published in Oracle Magazine, Jan./Feb. 2005, 2 pages.

Lee, Geoff, "Mastering XML DB Queries in Oracle Database 10g Release 2," An Oracle White Paper, Mar. 2005, 17 pages.

Lee, Geoff et al., "XQuery Support in Oracle Database 1g Release 2," PowerPoint Presentation, 59 pages.

Liu, Zhen Hua, et al., "Native XQuery Processing in Oracle XMLDB," 8 pages.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Melton, Jim, "ISO-ANSI Working Draft, XML-Related Specifications (SQL/XML)," WG3: DRS-020, H2-2002-365, Aug. 2002, 154 pages.

Noser, Hansrudi et al. "Dynamic #D Visualization of Database-Defined Tree Structures on WWW by Using Rewriting Systems," 2000, IEEE, XP-002262516, pp. 247-254.

Oracle Corporation, "Oracle9i XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.

Oracle Corporation, "Oracle9i XML Database Developer's Guide—Oracle XML DB," Release 2 (9.2), Mar. 2002, Part No. A96620-1, pp. 10-1 to 10-54.

Peng, Feng et al., "XPath queries on streaming data", 2003, ACM Press, pp. 431-442.

Ramakrishnan, Ragu et al."SRQL: Sorted Relational Query Language", Jul. 1-3, 1998, IEEE, pp. 84-95.

Shanmugasundaram, Jayavel, et al., "Querying XML Views of Relational Data," Proceedings of the 27$^{th}$ Very Large Databases Conference, Rome, Italy, Sep. 2001, pp. 261-270

Vion-Dury, Jean-Yves, "XPath on left and right sides of rules: toward compact XML tree rewriting through node patterns", 2003, ACM Press, pp. 19-25.

Vorthmann, Scott, et al., "Beyond Schemas, Schema Adjuncts and the Outside World," Markup Languages, Online!, vol. 2, No. 3, Jun. 2000, pp. 1-8.

W3C, "XML Schema Part 1: Structures," W3C Recommendation, May 2, 2001, retrieved from the internet:<http://www.w3.org/TR/2001/REC-xmlschema-1-20010502/>, retrieved on Apr. 14, 2005, pp. 1-186.

W3C, "XML Schema Part 2: Datatypes," W3C Recommendation, May 2, 2001, retrieved from the internet:<http://www.w3.org/TR/2001/REC-xmlschema-2-20010502/>, retrieved on Apr. 14, 2005, pp. 1-138.

W3C, "XQuery 1.0: An XML Query Language," W3C Recommendation, Working Draft, Oct. 29, 2004, retrieved from the internet<http://www.w3.org/TR/2004/WD-xquery-20041029>, retrieved on Apr. 14, 2005, pp. 1-189.

Microsoft Computer Dictionary, 2002, Microsoft Press, Fifth Edition, 3 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30$^{th}$ VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, $2^{nd}$ Edition, 4 pages.

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

Chakraborty, Krishnendu, "The XML Garbage Collector", The Source for Developers, Sun Developer Network Site XP-002297849, Mar. 2002.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data ," Proceeding of the International Conference on Very Large Databases, 2001, XP-002303292, pp. 341-350.

Diao, Y. et al., "Path Sharing and Predicate Evaluation for High-Performance XML Filtering" XP-002344354 *ACM Transactions on Database Systems* (2003), pp. 467-516.

Diao, Y. et al., "YFilter: Efficient and Scalable Filtering of XML Documents" *IEEE* (2002) 2 pages.

Drake, Mark et al., Oracle Corporation, "Understanding the Oracle9*i* XML Type," Nov. 1, 2001, http://otn.oracle.com/oramag/oracle/01-nov/o61xml.html?_template=/ocom/technology, data retrieved Jun. 29, 2004, pp. 1-5.

Gennick, Johnathan, Oracle Corporation, "SQL in, XML out," May 1, 2003, http://otn.oracle.com/oramag/oracle/03-may/o33xml.html?_template=/ocom/technology, data retrieved Jun. 29, 2004, pp. 1-4.

Helmer, S. et al., "Optimized Translations of XPath into Algebraic Expressions Parameterized by Programs Containing Navigational Primitives" *IEEE* (2002) 10 pages.

Higgins, Shelle, Oracle Corporation, "Oracle9*i*, Application Developer's Guide—XML," Release 1 (9.0.1), Jun. 2001, Part No. A88894-01, pp. 1-1,362.

Higgins, Shelley, Oracle Corporation, "Oracle9*i*, Case Studies—XML Applications," Release 1 (9.0.1), Jun. 2001, Part No. A88895-01, pp. 1-462.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Katz, Howard et al., "Integrating XQuery and Relational Database Systems," Chapter 7—*XQuery fromt the Experts: A Guide to the W3C XML Query Language*, Addison Wesley Professional, Aug. 22, 2003, ISBM 978-0-321-18060-5, pp. 353-391.

Kudrass, Thomas, "Management of XML Documents Without Schema in Relational Database Systems," Information and Software Technology, vol. 44, No. 4, Mar. 31, 2002, XP-004347776, pp. 269-275.

Lo et al., "XAS: A System for Accessing Componentized, Virtual XML Documents," IEEE, 2001, pp. 493-502.

McHugh, Jason et al., "Query Optimization for XML", XP-002333353, *Proceedings of the $25^{th}$ VLDB Conference* (1999) pp. 315-326.

McHugh, Jason, et al. "Indexing Semistructured Data," Stanford Science Department, 1998, XP-002248313, pp. 1-21.

Murthy, Ravi et al., "XML Schemas in Oracle XML DB," Proceedings of the 29th VLDB Conference, 2003, IEEE XP-002353604, pp. 1009-1018.

Myllymaki, Jussi, "Effective Wed data Extraction with Standard XML Technologies," WWW10, May 1-5, 2001, pp. 689-696.

Oracle, "Oracle iFS (Internet File System)," Mar. 1999, XP-002204710, 3 pages.

Oracle, "Oracle9*i* Application Server, Administrator's Guide," Release 2 (9.0.2), May 2002, Part No. A92171-02, Part No. A92171-02, pp. 1-392.

Park, Joon S., "Towards Secure Collaboration on the Semantic Web" (2003) ACM Press, vol. 33, Issue 2, pp. 1-10.

Rao , Herman Chung-Hwa, et al., "An Overview of the Internet File System," 1997, IEEE, XP-002204711, pp. 474-477.

Ricardo, Catherine, "Database Systems: Principles, Design, & Implementation," 1990, MacMillian Publishing Co., pp. 357-361, 379-380.

Ruey-Shun, Chen, et al., "Developing an XML framework for metadata system", Trinity College Dublin, Proc. of the 1st Inter. Sympo. on Information and Communication, pp. 267-272.

Schmidt et al.—"Efficient Relational Storage and Retrieval of XML Documents"—CWI, The Netherlands (pp. 1-6).

Schmidt et al., "Why and How to Benchmark XML Databases," SIGMOND Record, vol. 3, No. 3, Sep. 2001, pp. 27-32.

Thekkath, Chandramohan A. et al., "Implementing network protocols at user level" (1993) ACM Press, pp. 64-73.

W3C, "Extensible Markup Language (XML) 1.0 (Third Edition)", W3C Recommendation, dated Feb. 4, 2004, 34 pages.

W3C, "XML Fragment Interchange," W3C Working Draft, Jun. 30, 1999, XP-002167090, 17 pages.

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XML Syntax for XQuery 1.0 (XQueryX)," W3C Recommendation, Working Draft, Dec. 19, 2003, retrieved from the internet<http://www.w3.org/TR/2003/WD-xquery-20031219>, retrieved on Apr. 14, 2005, pp. 1-55.

W3C, "XQuery 1.0 and XPath 2.0 Data Model," W3C Working Draft dated Apr. 4, 2005, 91 pages.

Wallach, Deborah A. et al., "ASHs: Application-specific handlers for high-performance messaging" (1996) ACM Press, pp. 1-13.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Wansong, et al., "An Encoding Scheme for Indexing XML Data," E-Commerce and E-Service, 2004, XP-010697639, pp. 526-529.

Zhang, Xin et al., "Honey, I Shrunk the XQuery!—An XML Algebra Optimization Approach," Submission for WIDM'02, IEEE XP-002316448, 14 pages.

Zisman et al., "Using XML to Build Consistency Rules for Distributed Specifications," Proceedings of the Tenth International Workshop on Software Specification and Design (IWSD'00), IEEE 2000, 8 pages.

Goldman, Roy, et al., "DataGuides: Enabling Query Formulation and Optimization in Semistructured Databases", The International Conference on Very Large Data Bases, 1997, 21 pages.

Lumpkin, George et al., Oracle Corporation, "Query Optimization in Oracle9*i*," An Oracle White Paper, Feb. 2002, 30 pages.

Oracle Corp., "Oracle9iDatabase Daily Feature, Oracle9i Optimizer Statistics Collection Enhancements," Apr. 23, 2003, http://otn.oracle.com/products/oracle9i/daily/apr23.html?_template=/ocom/technology/con, pp. 1-2.

Burleson, Donald K., Oracle Corporation, "Cost Control: Inside the Oracle Optimizer," 2003, http://otn.oracle.com/oramag/columns/2003/techarticles/burleson_cob_pt1.html, data retrieved Jul. 16, 2004, 15 pages.

Banerjee, Sandeepan, Oracle Corporation, "Oracle 9i 'Project XDB'—The XML Database," http://www.grandpoohbah.net/Sandeepan/IOUG2001XDB.htm, data retrieved Feb. 6, 2004, pp. 1-18.

Oracle Corp., "Resource_View and Path_View," Oracle9iXML Database Developer's Guide—Oracle XML DB, Release 2 (9.2), Part No. A96620-02, 2002, http://www.cs.utah.edu/classes/cs5530/oracle/doc/B10501_01/appdev.920/a99620/xdb19res, data retrieved Feb. 6, 2004, pp. 1-13.

Halverson et al., "Mixed Mode XML Query Processing", Proceedings of the 29th VLDB Conference, Sep. 12-13, 2003, 12 pages.

Aboulnaga et al., "Building XML Statistics for the Hidden Web", Proceedings of the 28th VLDB Conference, 2002, 14 pages.

Oracle Corp., "Under_Path," Oracle9iSQL Reference, Release 2 (9.2), Part No. A96540-01, 1996, 2002, http://www.lc.leidenuniv.nl/awcourse/oracle/server.920/a96540/conditions12a.htm, data retrieved Feb. 6, 2004, 8 pages.

Jagadish et al., "TIMBER: A Native XML Database", The VLDB Journal, published online Dec. 19, 2002, 18 pages.

* cited by examiner

INTERLEAVING QUERY TRANSFORMATIONS FOR XML INDEXES

RELATED APPLICATIONS

This application is related to U.S. Pat. No. 6,427,123, entitled Hierarchical Indexing For Accessing Hierarchically Organized Information In A Relational System, filed on Feb. 18, 1999, the contents of which are herein incorporated by reference in their entirety.

This application is related to U.S. Pat. No. 7,051,033, entitled Providing A Consistent Hierarchical Abstraction Of Relational Data, filed on Sep. 27, 2002, the contents of which are herein incorporated by reference.

This application is related to U.S. patent application Ser. No. 10/260,381, entitled Mechanism To Efficiently Index Structured Data That Provides Hierarchical Access In A Relational Database System, filed on Sep. 27, 2002, the contents of which are herein incorporated by reference.

This application is related to U.S. patent application Ser. No. 10/884,311, entitled Index For Accessing XML Data, filed on Jul. 2, 2004, the contents of which are herein incorporated by reference in their entirety.

This application is related to U.S. application Ser. No. 10/944,170 entitled Efficient Query Processing of XML Data Using XML Index filed on Sep. 16, 2004, the contents of which are herein incorporated by reference.

FIELD OF THE INVENTION

The present invention relates to database systems, and in particular, to optimization of queries executed by a database system.

BACKGROUND

Relational and object-relational database management systems (hereafter "relational DBMS") store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

Relational DBMSs may be enhanced to store XML data and are able to handle queries that use XML semantics to specify database operations, using XML query languages, such as XQuery and XPath. XML Query Language ("XQuery") and XML Path Language ("XPath") are important standards for a query language, and can be used in conjunction with SQL to express a large variety of useful queries. The term XML query is used to refer to queries that conform to SQL and/or XQuery, XPath, and/or another XML language standard, including proprietary dialects of XQuery, XPath, SQL, or XML standard languages. XML queries include SQL queries that embed XQuery and XPath expressions, XQuery queries that are not embedded within an SQL statement. When a relational DBMS receives a XML query, the database server may perform a XML rewrite to refer to the underlying base tables and database objects that store the XML data.

Query Optimizer

A query submitted to a database server is evaluated by a query optimizer. Based on the evaluation, the query optimizer generates an execution plan that defines operations for executing the query. Typically, the query optimizer generates an execution plan optimized for efficient execution. When a query optimizer evaluates a query, it determines various candidate execution plans" and selects an optimal execution plan.

During query optimization, different kinds of query transformations are performed. The query may be transformed into one or more semantically equivalent queries. A query is semantically equivalent to another when the queries request (or declare) the same results; computation of either should return the same result. A query may be computed more efficiently once transformed.

There are various kinds of transformations. For example, view merging is a type of transformation in which a subquery within the FROM clause ("inline view") of the "outer query" is removed and is merged into the outer query to produce a semantically equivalent query.

The term kind or type of transformation, as used herein, refers transformations that are rewritten in a particular way or using specific types of rewrite operations.

Another type of rewrite is an XML rewrite. Typically, XML data is stored in underlying relational structures referred to as base structures. An XML rewrite rewrites expressions based on XML semantics (e.g. XPath and XQuery) into an expression that references the base structures.

A type of XML rewrite is an XML index rewrite. An XML index rewrite rewrites an XML query to refer to one or more structures of an XML index. An XML index is a "logical index" which indexes a collection of XML documents. A logical index contains multiple structures that are cooperatively used to access a collection of XML documents. A logical index includes a path table, which contains information about the hierarchies of nodes in a collection of XML documents and may contain the node values of the nodes. Among the columns or attributes of the path table is a column that stores the values of nodes, a pathid column that stores the path (in the form of a path id) of nodes, and a dewey_key column, which contains order keys that represent a hierarchical position of a node in a document, e.g. the order key value 3.21.5 specifies $5^{th}$ child of $21^{st}$ child of $3^{rd}$ child of root.

An example of a XML index is described in Index For Accessing XML Data.

Order of Transformations

When determining how to optimize a query, many transformations and/or combinations of transforms can be applied. Applying a transformation consumes computer resources; doing this for all or even a proportion of all combinations of query transformations of a query may create a cost that is significant compared to the cost of computing the original query, if not more. To reduce costs of transforming queries, different types of transformations are applied in a predetermined order or sequence, referred to herein as a transformation sequence. The order in which the types of transformation are applied in a transformation sequence may be based on the way the kinds of transformations interact.

For example, an XML rewrite may create in an inline view, which can be merged using view merging. Thus, in a transformation sequence, an XML rewrite of a query is applied before view merging so that the view merge merges the inline view generated by the XML rewrite.

In general, a query optimizer generates optimized execution plans when the query optimizer is able to perform more kinds of transformations under more kinds of conditions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
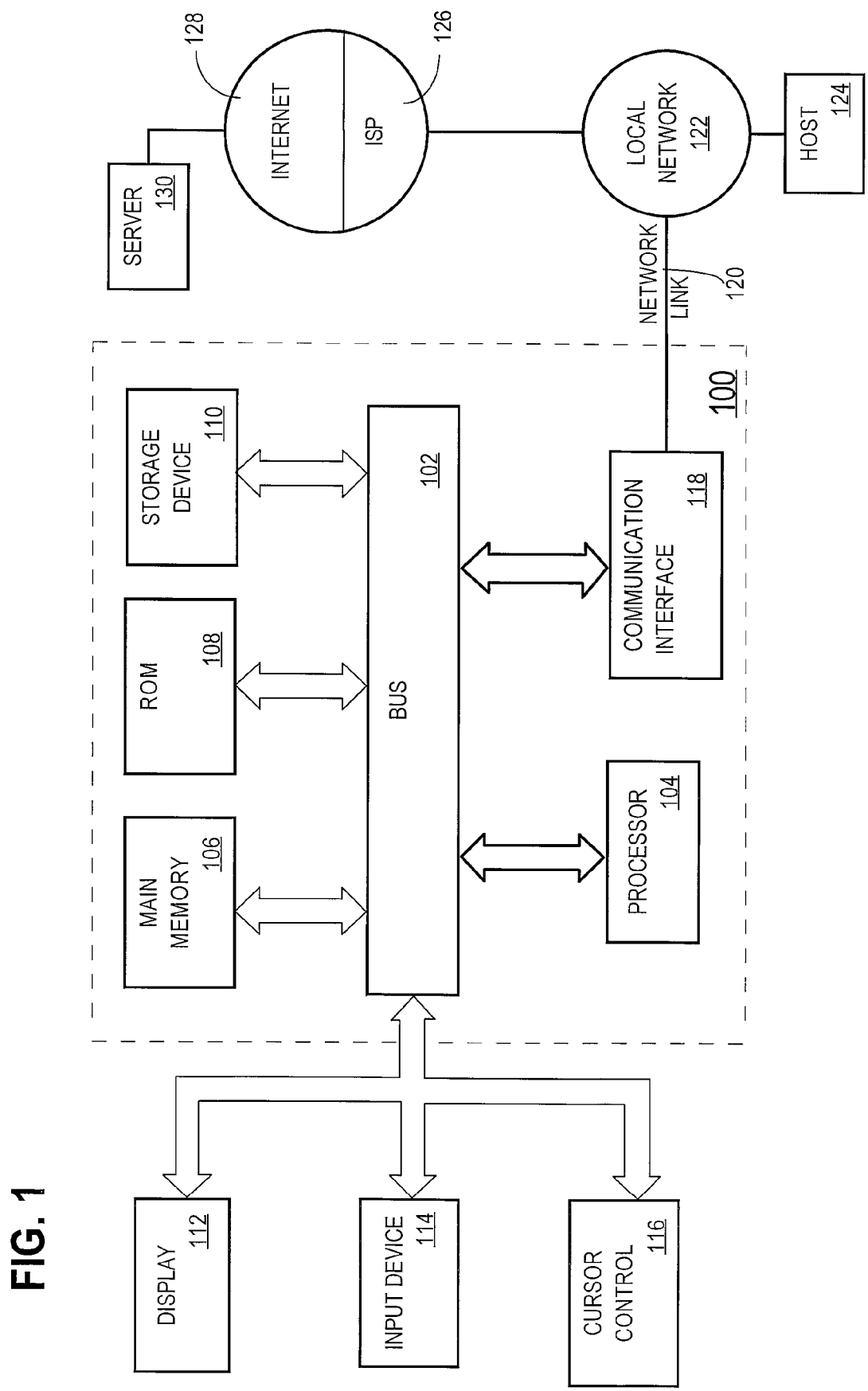
FIG. 1 is a diagram of computer system that may be used in an implementation of an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

During query optimization, view merge transformation and XML index rewrite are interleaved. Types of transformations are interleaved when one of the types is performed and then performed again after performing the other of the types.

For example, a view merge and XML index rewrite are interleaved when a view merge is applied, followed by applying an XML index rewrite to the query, and then followed by applying a view merge. Each query transformation may yield a transformed query that is even more efficient to compute.

At least two query transformations may be described herein as both being applied to a query. This is a convenient way of expressing that a first of the at least two transformations is applied to a query to generate a first transformed query, and then the second of the at least two transformations is applied to the first transformed query to generate a second transformed query. In fact, one or more transformations may be applied between the first and second transformations.

For example, when a view merge and an XML index rewrite are described as being applied to a query, the view merge is applied to generate a first transformed query, which may be further transformed to produce one or more subsequent transformed queries, and then an XML index rewrite is applied to the first transformed query or the last of the one of the one or more subsequent queries.

Techniques for interleaving XML index rewrite and view merge transformations are illustrated in the context of a repository of XML data, described below.

Illustrative Operating Environment

Queries are submitted to and rewritten by a relational DBMS that can function as a repository of XML documents. The repository stores and manages access to resources, including in particular, XML documents. Similar to a hierarchical file system, XML documents in a repository are organized according to a hierarchy referred to herein as a repository hierarchy. Each XML document may be located, identified, or addressed by tracing a path, referred to herein as a repository path, through the hierarchy to the XML document. For a given XML document, a repository path begins at a root directory and proceeds down a hierarchy of directories to eventually arrive at the directory that contains the XML document.

Within the repository, each XML document may be represented by and stored/contained within a row of an object-relational table referred to herein as a repository table. For example, a repository table may contain a column of the type XMLType. For a given row in the repository table, a representation of an XML document is stored in the column.

A XML repository provides access to XML data in the repository by responding to XML queries. Such queries are optimized by a query optimizer, which may transform the queries as described below.

Illustration of Interleaving

An approach for interleaving view merge and XML index rewrite are illustrated using the following query QI.

```
QI=
    select extract(value(T), '/c/d')
    from xmltable('for $doc in
        ora:view("/public/bal/asha")/a/b return $doc') T;
```

For purposes of exposition, queries that are used to illustrate rewrites of queries, such as query QI, are rewritten in a form that may not completely conform to standard or proprietary forms of SQL/XML, and XPATH, and XQUERY, and may omit expressions whose presence in the illustration are not needed for understanding an embodiment of the present invention. Query expressions that deviate from language syntax shall be explained and/or are apparent to those of ordinary skill in the art.

Query QI is an XML query that contains an inline view in the form of an xmltable operator in the from clause. The argument of the xmltable operator is a XQuery query expression. The query expression refers to the XQuery function ora:view, which is supported by Oracle Corporation. The view expression ora: view ("/public /bal/asha/") /a/b specifies to return as a sequence of items, the nodes identified by the XPath expression /a/b within a collection of XML documents, where the collection is stored within the repository path/public/bal/asha/. In the repository, each of the XML documents is contained in a row of table resource_table in association with a resource path. The xmltable operator returns, for each of the items in the sequence returned for ora:view, a row having an XMLType column that contains an item in the sequence.

Rewrite View

The query optimizer next rewrites the inline view in QI, resulting in query QI1, as follows.

```
QI1=
    select extract(value(T), '/c/d')
    from table(select extract(value(T1), '/a/b')
            from resource_table T1
            where equals_path(T1, '/public/bal/asha')=1...)
        T
```

The xmltable operator, with its XQuery expression argument, are replaced with a table operator and a subquery argument, the subquery being select extract(value(T1), '/a/b') from resource_table T1 where equals_path(T1, '/public/bal/asha')=1 . . . . The subquery in effect replaces the ora:view expression. This transformation may be referred to either as a XQuery transformation because an XQuery expression has been transformed or as a view conversion because a view expression has been replaced by an equivalent expression.

View Merge

In the next transformation, a view merge is performed to yield query QI2, as follows.

```
QI2=
    select extract(value(T), '/c/d')
    from resource_table T1, table(select extract(value(T1),
        '/a/b')
                                from T1) T
    where equals_path(T1, '/public/bal/asha')=1
```

Under a transformation sequence, in which an XML index rewrite must be performed before a view merge, an XML index rewrite would not have been applied to QI2. However, when XML rewrite and view merge are interleaved, an XML index rewrite may follow the view merge, as shown below, to yield a possibly more efficient to compute transformed query. This transformed query is even further optimized by applying yet another view merge, as follows.

XML Rewrite and View Merge

In the next transformations, an XML index rewrite is performed followed by a view merge. Applying an XML index rewrite to QI2 yields QI3, as follows.

```
QI3=
    select extract(value(T), '/c/d')
    from resource_table T1, table(select *
                                from index_path_table T2
                                where T2.pathid = '/a/b'...)
        T
    where equals_path(T1, '/public/bal/asha')=1... .
```

The XML index rewrite replaces the subquery table argument of QI2 with a subquery of table index_path_table, the path table of the XML index. As the table operator is an inline view, there is another opportunity for further optimization by applying a view merge. Applying a view merge to query QI3 yields query QI4, as follows.

```
QI4=
    select extract(make-node(T2), '/c/d')
    from repos_table T1, index_path_table T2
    where equals_path(T1, '/public/bal/asha')=1 and
        T2.pathid = '/a/b' .............. .
```

Finally, yet another XML index rewrite can be applied to QI4 to yield a possibly more efficient query QI5, as follows.

```
QI5= select make-node(T3)
    from repos_table T1, index_path_table T2,
    index_path_table T3
    where equals_path(T1, '/public/bal/asha')=1 and
        T2.pathid = '/a/b' .............. and
        T2.dewey_key < T3.dewey_key <
    maxchild(T2.dewey_key)
        T3.pathid like '%/c/d'...
```

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for rewriting a query that contains a XML query based-expression, the method comprising,
    performing a first XML rewrite transformation on said query to generate a first inline view that replaces said XML query based-expression, said XML query based-expression being based on a XML query language that supports flow control commands and path expressions, said XML query based-expression including a path expression;
    after performing said first XML rewrite transformation, performing a first view merge operation on said query to merge said first inline view within said query;
    after performing said first view merge operation, performing an XML index rewrite on said query to generate a second inline view referencing database objects of an XML index and expressing an evaluation based on said path expression;
    after performing said XML index rewrite transformation, performing a second view merge operation on said second inline view to merge said second inline view within said query; and
    wherein the method is performed by one or more computing devices.

2. The method of claim 1, wherein the steps further include performing another XML rewrite transformation on said query after performing a second view merge operation.

3. The method of claim 2, wherein said another XML rewrite transformation is an XML index rewrite transformation.

4. The method of claim 1, wherein the steps further include performing an additional query transformation on said query between said performing a first XML rewrite transformation and performing a second view merge operation.

5. The method of claim 1, wherein the additional query transformation is not a view merge transformation and is not an XML rewrite transformation.

6. The method of claim 1, wherein said XML query language is XQuery.

7. A non-transitory computer-readable storage medium storing one or more sequences of instructions, said one or more instructions, which, when executed by one or more processors, causes the one or more processors to perform steps of:
    performing a first XML rewrite transformation on said query to generate a first inline view that replaces said XML query based-expression, said XML query based-expression being based on a XML query language that supports flow control commands and path expressions, said XML query based-expression including a path expression;
    after performing said first XML rewrite transformation, performing a first view merge operation on said query to merge said first inline view within said query;
    after performing said first view merge operation, performing an XML index rewrite on said query to generate a second inline view referencing database objects of an XML index and expressing an evaluation based on said path expression; and
    after performing said XML index rewrite transformation, performing a second view merge operation on said second inline view to merge said second inline view within said query.

8. The non-transitory computer-readable storage medium of claim 7, wherein the steps further include performing another XML rewrite transformation on said query after performing a second view merge operation.

9. The non-transitory computer-readable storage medium of claim 8, wherein said another XML rewrite transformation is an XML index rewrite transformation.

10. The non-transitory computer-readable storage medium of claim 7, wherein the steps further include performing an additional query transformation on said query between said performing a first XML rewrite transformation and performing a second view merge operation.

11. The non-transitory computer-readable storage medium of claim 7, wherein the additional query transformation is not a view merge transformation and is not an XML rewrite transformation.

12. The non-transitory computer-readable storage medium of claim 7, wherein said XML query language is XQuery.

* * * * *

UNITED STATES PATENT AND TRADEMARK OFFICE
CERTIFICATE OF CORRECTION

| | | |
|---|---|---|
| PATENT NO. | : 7,958,112 B2 | Page 1 of 1 |
| APPLICATION NO. | : 12/189007 | |
| DATED | : June 7, 2011 | |
| INVENTOR(S) | : Chandrasekar et al. | |

It is certified that error appears in the above-identified patent and that said Letters Patent is hereby corrected as shown below:

Title page 4, in column 1, under "Other Publications", line 4, delete "Hewlitt" and insert -- Hewlett --, therefor.

Title page 5, in column 1, under "Other Publications", line 11, delete "XQuey" and insert -- XQuery --, therefor.

Title page 5, in column 1, under "Other Publications", line 44, delete "fromt" and insert -- from --, therefor.

Title page 5, in column 2, under "Other Publications", line 2, delete "MacMillian" and insert -- MacMillan --, therefor.

Title page 5, in column 2, under "Other Publications", line 10, Delete "SIGMOND" and insert -- SIGMOD --, therefor.

Signed and Sealed this
Twenty-fifth Day of October, 2011

David J. Kappos
*Director of the United States Patent and Trademark Office*